US012456592B1

(12) United States Patent
Zeng et al.

(10) Patent No.: US 12,456,592 B1
(45) Date of Patent: Oct. 28, 2025

(54) CAPACITOR ROCKER DEVICE AND REMOTE CONTROL

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN); Hui Qiu, Shenzhen (CN)

(73) Assignee: GUANGDONG K-SILVER INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 18/747,677

(22) Filed: Jun. 19, 2024

(30) Foreign Application Priority Data

Apr. 28, 2024 (CN) .......................... 202410520072.2

(51) Int. Cl.
| | |
|---|---|
| *H01H 9/02* | (2006.01) |
| *H01H 9/06* | (2006.01) |
| *H01H 23/00* | (2006.01) |
| *H01H 23/14* | (2006.01) |

(52) U.S. Cl.
CPC .......... *H01H 9/061* (2013.01); *H01H 23/003* (2013.01); *H01H 23/141* (2013.01); *H01H 23/146* (2013.01); *H01H 2231/032* (2013.01); *H01H 2239/006* (2013.01)

(58) Field of Classification Search
CPC ............ H01H 9/02; H01H 9/06; H01H 9/061; H01H 23/003; H01H 23/02; H01H 23/12; H01H 23/141; H01H 23/146; H01H 23/16; H01H 23/162; H01H 2231/032; H01H 2239/006
See application file for complete search history.

(56) References Cited

U.S. PATENT DOCUMENTS

| | | | |
|---|---|---|---|
| 2016/0004333 A1* | 1/2016 | Yamai ................... | G06F 3/0338 345/161 |
| 2022/0246370 A1* | 8/2022 | Fujihara ................. | H01H 13/14 |

* cited by examiner

*Primary Examiner* — Long Nguyen
(74) *Attorney, Agent, or Firm* — Westbridge IP LLC

(57) ABSTRACT

Disclosed are a capacitor rocker device and a remote control. The capacitor rocker device includes a shell, a rocker arm assembly, a rocker assembly, two capacitor assemblies and a control assembly. Each capacitor assembly includes a first electrode sheet, a second electrode sheet and a third electrode sheet. A first facing distance is provided between the first electrode sheet and the second electrode sheet to form a first capacitor, and a second facing distance is provided between the first electrode sheet and the third electrode sheet to form a second capacitor. The rocker assembly is configured to push the rocker arm to swing and drive the swing member to swing within the first facing distance and the second facing distance, and a capacitance value of the first capacitor and a capacitance value of the second capacitor change with the swing of the swing member.

10 Claims, 7 Drawing Sheets

CAPACITOR ROCKER DEVICE AND REMOTE CONTROL

CROSS-REFERENCE TO RELATED APPLICATIONS

This application claims priority to Chinese Patent Application No. 202410520072.2, filed on Apr. 28, 2024, the content of which is incorporated herein by reference in its entirety.

TECHNICAL FIELD

The present application relates to the technical field of remote controls, and in particular, to a capacitor rocker device and a remote control.

BACKGROUND

A drone is an unmanned aerial vehicle (UAV) that is controlled through either a radio remote control device or an onboard computer program system. Drones are characterized by their simple structure and low operating costs. They can perform tasks typically executed by manned aircraft and are particularly suitable for missions where manned aircraft are not ideal. Aerial photography drones are relatively common in the civilian sector, with operators rocking the rocker to send corresponding signals.

In the related art, conventional carbon film resistor rockers have limited lifespan due to process limitations. Furthermore, during use, the friction between the elastic piece and the carbon film resistor can lead to carbon particle adhesion, causing drift issues and resulting in poor performance stability. To address these problems, Hall effect rockers have emerged on the market. However, Hall effect rockers have high power consumption, making them unsuitable for low-power products. Additionally, remote control users are increasingly demanding higher control precision and better tactile feedback from their remote controls.

SUMMARY

The main purpose of the present application is to provide a capacitor rocker device and a remote control, which aims to reduce the power consumption of the rocker device, improve the control precision of the remote control, or enhance the tactile feedback of the remote control.

In order to achieve the above purpose, the present application provides a capacitor rocker device, including:

a shell;

two rocker arm assemblies, installed on the shell, wherein each rocker arm assembly includes a rocker arm, a swinging member, a bearing and an installation seat, and the rocker arm includes a rocker arm body and a first connection portion provided on the rocker arm body; the installation seat is provided with a first installation through hole, and the first connection portion is penetrated through the first installation through hole; the bearing is sleeved on the first connection portion, and the bearing is provided inside the first installation through hole; the swinging member is provided on the first connection portion;

a rocker assembly, configured to push the rocker arm to rotate and drive the swinging member to swing;

two capacitor assemblies, wherein each capacitor assembly includes a first electrode sheet, a second electrode sheet and a third electrode sheet, and the second electrode sheet and the third electrode sheet are provided on a same side of the first electrode sheet; a first facing distance is provided between the first electrode sheet and the second electrode sheet to form a first capacitor; a second facing distance is provided between the first electrode sheet and the third electrode sheet to form a second capacitor; one end of the swing member is configured to extend into the first facing distance and the second facing distance, and the rocker assembly is configured to push the rocker arm to swing and drive the swing member to swing within the first facing distance and the second facing distance; a capacitance value of the first capacitor and a capacitance value of the second capacitor change with the swing of the swing member; and a control assembly, installed on the shell, wherein the control assembly includes an electric control board and a capacitance detection chip provided on the electric control board and electrically connected to the electric control board; the electric control board and the capacitance detection chip are electrically connected to the first electrode sheet, the second electrode sheet and the third electrode sheet respectively; the capacitance detection chip is configured to detect the capacitance value of the first capacitor and the capacitance value of the second capacitor, and the electric control board is configured to output corresponding position information according to a change in a ratio of the capacitance value of the first capacitor to the capacitance value of the second capacitor.

In an embodiment, two control assemblies are provided, and each control assembly is configured to control a corresponding capacitor assembly.

In an embodiment, the first electrode sheet/the second electrode sheet/the third electrode sheet includes an electrode sheet body and a third connection portion provided on the electrode sheet body; the third connection portion is welded to the electric control board, and the third connection portion is integrally formed with the electric control board.

In an embodiment, the electric control board is provided with a second installation through hole, and the third connection portion is penetrated through the second installation through hole to be welded to the electric control board.

In an embodiment, the installation seat is configured to install the capacitor assembly, and the installation seat includes a base and an installation portion provided on the base; the installation portion is provided with the first installation through hole, and the base is provided with three first installation grooves and a second installation groove; the three first installation grooves are configured to install the first electrode sheet, the second electrode sheet and the third electrode sheet respectively; an opening of the first installation groove is provided toward the electronic control board; one side of the second installation groove is communicated with the three first installation grooves, and the other side of the second installation groove is communicated with the first installation through hole; the swinging member is configured to extend into the second installation groove.

In an embodiment, the first electrode sheet/the second electrode sheet/the third electrode sheet includes a first bending portion and a second bending portion, and the electrode sheet body, the first bending portion and the second bending portion are bent in sequence.

In an embodiment, the rocker arm includes a second connection portion, and the second connection portion and the first connection portion are provided at opposite ends of the rocker arm body; the swinging member is provided on the first connection portion; the capacitor rocker device further includes a reset assembly provided on the second connection portion, and the reset assembly is configured to restore the rocker body, the rocker arm and the swinging member to initial positions.

In an embodiment, the reset assembly includes a first reset arm, a second reset arm and an elastic reset member, and the first reset arm is provided on the second connection portion; one end of the second reset arm is rotatably connected to the first reset arm, and the other end of the second reset arm is connected to the first reset arm through the elastic reset member.

In an embodiment, an end surface of the swinging member inserted into the first facing distance and the second facing distance is provided in a convex arc shape.

The present application further provides a remote control including the above-mentioned capacitor rocker device.

The technical solution of the present application reduces the power consumption of the rocker device by utilizing a capacitive sensor as the detection component to detect the operator's input. Additionally, the bearing provided in this technical solution enhances the tactile feedback and efficiency of the rocker, making remote control operations more stable and precise. Furthermore, by detecting the ratio change between the capacitance values of two capacitors, the application can determine the position information input by the user through the rocker assembly, thereby mitigating the impact of environmental factors (such as temperature and humidity) on capacitance values and improving the control precision of the rocker device.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
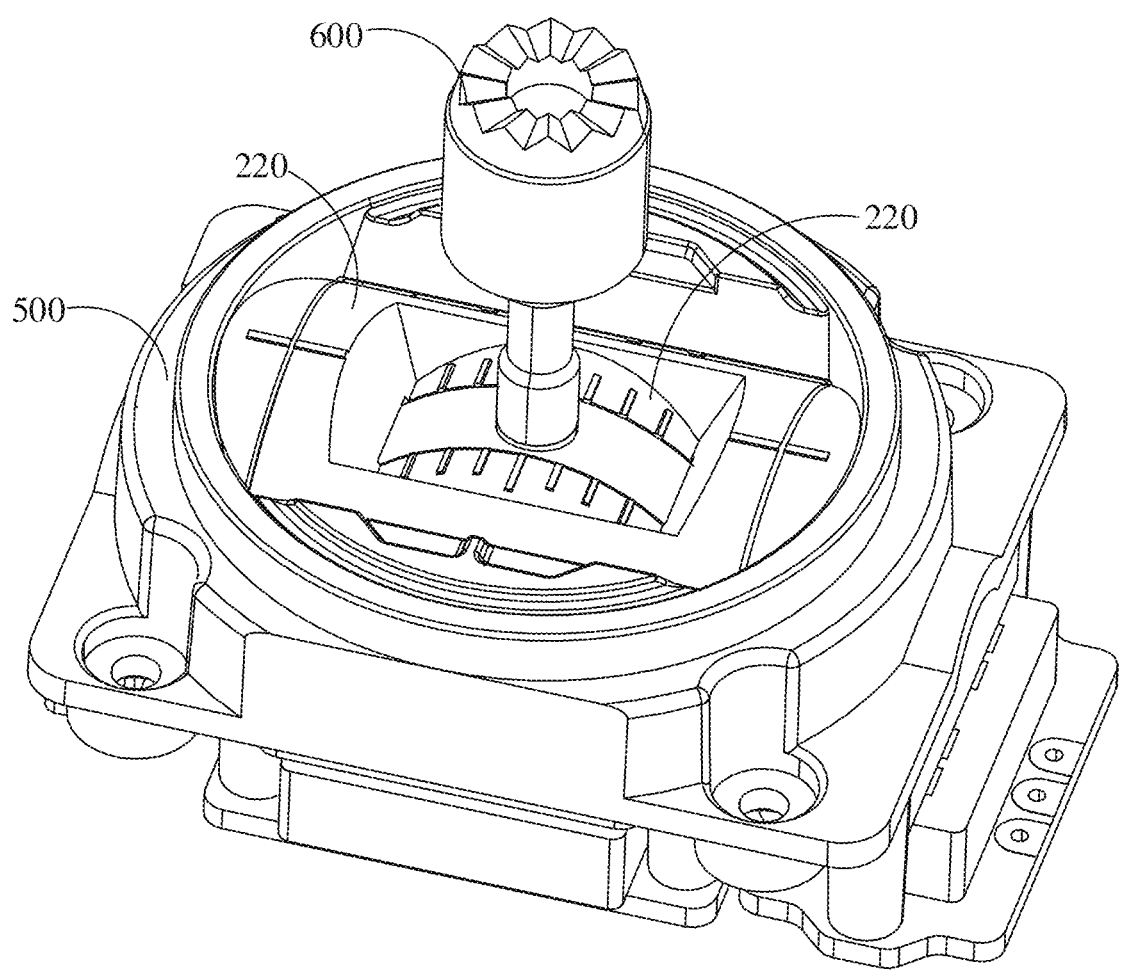
FIG. 1 is a schematic structural view of a capacitor rocker device according to an embodiment of the present application.

The realization of the purpose, functional characteristics and advantages of the present application will be further described with reference to the accompanying drawings in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that if there are directional indications (such as up, down, left, right, front, rear, etc.) in the present application, the directional indications are only used to explain the relative positional relationship, movement situation, etc. among components in a specific attitude (as shown in the drawings). If the specific attitude changes, the directional indication also changes accordingly.

In addition, the descriptions related to "first", "second" and the like in the present application are merely for descriptive purposes, and should not be understood as indicating or implying their relative importance or implicitly indicating the number of technical features indicated. Therefore, the features defined by "first" and "second" may explicitly or implicitly include at least one such feature. In addition, "and/or" in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

The present application provides a capacitor rocker device, which aims to reduce the power consumption of the rocker device or improve the control accuracy of the remote control. For ease of understanding and explanation, in the FIG. 1 to FIG. 7 in the specification of the present application, the solid arrows indicate spaces, slots or holes.

As shown in FIG. 1 to FIG. 7, in an embodiment of the present application, the capacitor rocker device 10 includes a shell 500, two rocker arm assemblies 200, rocker assembly 600, and control assembly 300. The two rocker arm assemblies 200 are installed on the shell 500. Each rocker arm assemblies 200 includes a rocker arm, a swinging member 230, a bearing 240 and an installation seat 250. The rocker arm 220 includes a rocker arm body 201 and a first connection portion 202 provided on the rocker arm body 201. The installation seat 250 is provided with a first installation through hole 252a. The first connection portion 202 is penetrated through the first installation through hole 252a. The bearing 240 is sleeved on the first connection portion 202. The bearing 240 is provided in the first installation through hole 252a. The swinging member 230 is provided in the first connection portion 202.

The rocker assembly 600 is configured to push the rocker arm 220 to rotate and drive the swinging member 230 to swing.

Each the capacitor assembly 100 includes a first electrode sheet 110, a second electrode sheet 120 and a third electrode sheet 130, the second electrode sheet 120 and the third electrode sheet 130 are provided on a same side of the first electrode sheet 110. A first facing distance 104 is provided between the first electrode sheet 110 and the second electrode sheet 120 to form a first capacitor; and a second facing distance 105 is provided between the first electrode sheet 110 and the third electrode sheet 130 to form a second capacitor. One end of the swinging member 230 extends into the first facing distance 104 and the second facing distance

105, the rocker assembly 600 is configured to push a upper rocker arm 210 and a lower rocker arm 220 to swing, and drive the swinging member 230 to swing within the first facing distance 104 and the second facing distance 105, and the capacitance value of the first capacitor and the capacitance value of the second capacitor change with the swinging of the swinging member 230.

The control assembly 300 is installed on the shell 500, the control assembly 300 includes an electric control board 310 and a capacitance detection chip 320 provided on the electric control board 310 and electrically connected to the electric control board 310. The electric control board 310 and the capacitance detection chip 320 are electrically connected to the first electrode sheet 110, and the second electrode sheet 120 and the third electrode sheet 130 respectively. The capacitance detection chip 320 is configured to detect the capacitance value of the first capacitor and the capacitance value of the second capacitor. The electric control board 310 is configured to output corresponding position information according to the change in the ratio of the capacitance value of the first capacitor to the capacitance value of the second capacitor.

Firstly, the capacitor rocker device 10 is more power-saving than the Hall rocker device because of the following two reasons. First, the working principle is different: the capacitor rocker uses a capacitive sensor to detect the operator's input, while the Hall rocker uses a Hall effect sensor. The power consumption of the capacitive sensor is usually lower than that of the Hall effect sensor, so the power consumption of the capacitor rocker is also relatively low. Second, the signal processing is different: the capacitor rocker sends the capacitance data to the main circuit board for calculation and output, while the Hall rocker requires an additional circuit for signal processing, which also increases its power consumption. Therefore, the technical solution of the present application has the advantage of low power consumption.

Secondly, in the related art, the metal electrode sheet and the electric control board 310 of the capacitor rocker are provided at intervals from each other to form a capacitive field. When the rocker rotates, the capacitance value between the metal electrode sheet and the electric control board 310 will change, thereby generating a signal. In this technical solution, the capacitance value between the metal electrode sheet and the electric control board 310 is easily affected by the external environment. For example, since the distance between the metal electrode sheet and the electric control board 310 is very small, the change of temperature and humidity makes the distance between the metal electrode sheet and the electric control board 310 increase or decrease (thermal expansion and contraction). Even if the change is small, it will have a great impact on the capacitance value between the metal electrode sheet and the electric control board 310. Therefore, the present application determines the position information input by the user through the rocker assembly 600 by using the ratio of the capacitance values of the two capacitors, which can avoid the influence of environmental factors (temperature and humidity, etc.) on the capacitance value, thereby improving the control accuracy of the rocker device 10.

The technical solution of the present application uses a capacitive sensor as a detection component of the capacitor rocker device 10 to detect the input of the operator, thereby reducing the power consumption of the capacitor rocker device 10. In addition, the bearing 240 provided in the technical solution of the present application can improve the feel and efficiency of the rocker arm, making it more stable and accurate during remote control. Furthermore, the present application also detects the change in the ratio of the capacitance values of the two capacitors at the connection between the rocker arm and the mounting seat to determine the position information input by the user through the rocker assembly 600, which can avoid the influence of environmental factors (temperature and humidity, etc.) on the capacitance value, thereby improving the control accuracy of the capacitor rocker device 10.

The shell 500 is used as a support for installing other components of the capacitor rocker device 10. Its shape and structure are mainly set to adapt to different usage scenarios, which will not be described in detail here.

The rocker assembly 600 generally includes a connecting member and an operating member, and the connecting member is generally connected to the rocker arm assembly 200 to facilitate the rocker arm assembly 200 to swing.

Figure 3:
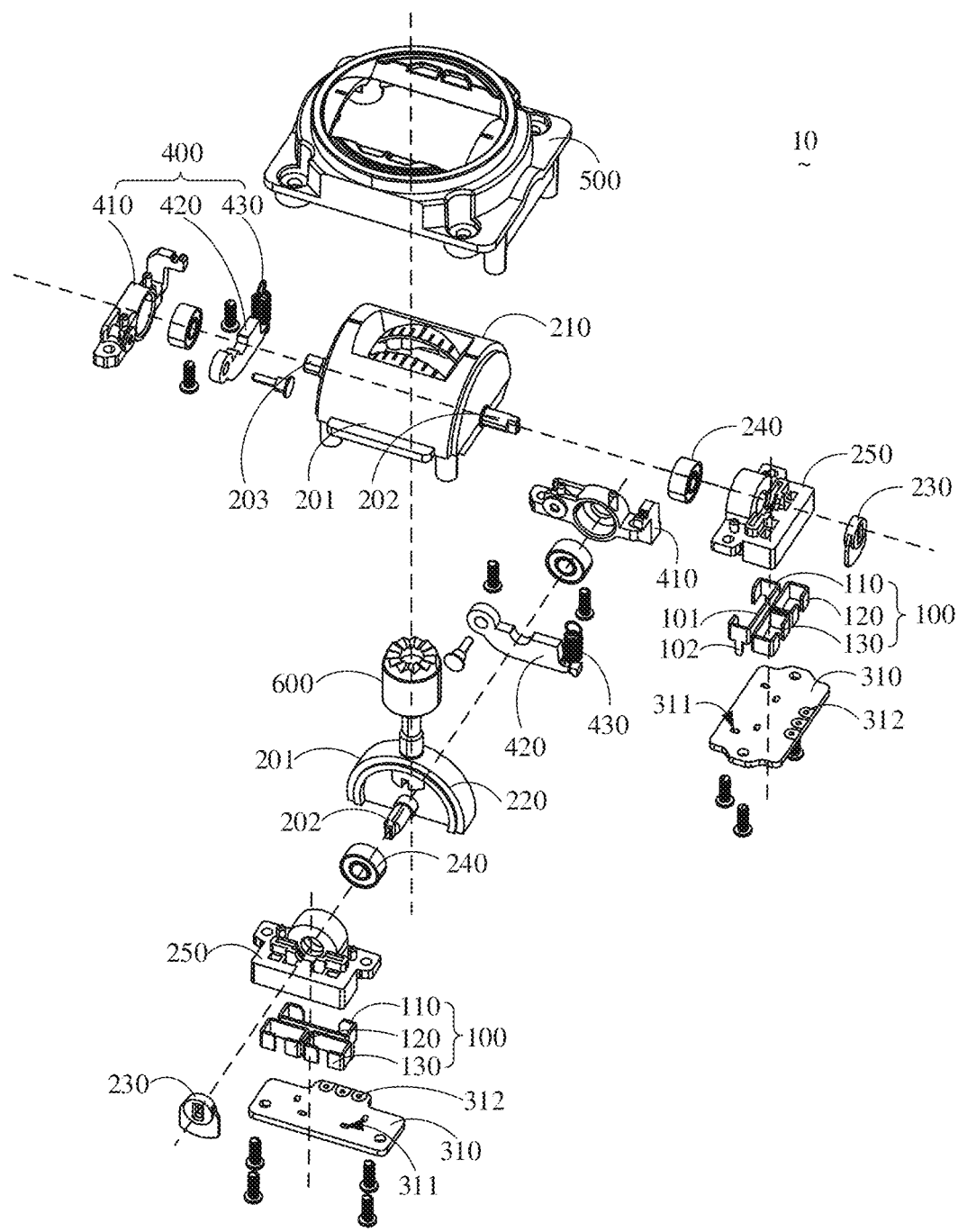
FIG. 3 is a schematic exploded view of the capacitor rocker device in FIG. 1.

As shown in FIG. 3, each rocker arm assembly 200 includes a rocker arm. The present embodiment has two rocker arm assemblies 200, that is, two rocker arms. For the convenience of description, one rocker arms is an upper rocker arm 210 and the other rocker arms is a lower rocker arm 220. The upper rocker arm 210 and the lower rocker arm 220 are vertically provided with each other. A swinging member 230 is provided at one end of the upper rocker arm 210 and the lower rocker arm 220. The upper rocker arm 210 and the lower rocker arm 220 rotate according to the tilting operation of the rocker, thereby driving the swinging member 230 to swing. The upper rocker arm 210 and the lower rocker arm 220 rotate according to the tilting operation of the rocker, thereby driving the swinging member 230 to swing. The upper rocker arm 210 and the lower rocker arm 220 are determined according to the position in which the upper rocker arm 210 is on the lower rocker arm 220 when in use.

The bearing 240 is configured to enhance the user's use feel, the installation seat 250 is provided with a first installation through hole 252a, the first connection portion 202 is inserted through the first installation through hole 252a, the bearing 240 is sleeved on the first connection portion 202, and the bearing 240 is located in the first installation through hole 252a. In this way, by arranging the bearing 240 in the first connection portion 202, the stability between the rocker arm and the installation seat can be increased, and the rocker arm is more stable and less likely to shake when in use. Secondly, the arrangement of the bearing 240 can enhance the operating feel of the rocker arm, allowing the operator to more accurately control the movement of the rocker arm. In addition, the bearing 240 can also reduce the resistance of the rocker arm during movement, so that the operator can operate the rocker arm more smoothly. Therefore, the setting of the bearing 240 can improve the use feel and efficiency of the rocker arm, making it more stable and accurate during remote control.

The number of the capacitor assembly 100 is two, one is configured to detect the swinging condition of the swinging member 230 of the upper rocker arm 210, and the other group is configured to detect the swinging condition of the swinging member 230 of the lower rocker arm 220. In an embodiment of the present application, each of the capacitor assemblies 100 includes a first electrode sheet 110, a second electrode sheet 120, and a third electrode sheet 130. The second electrode sheet 120 and the third electrode sheet 130 are disposed on the same side of the first electrode sheet 110. A first facing distance 104 is provided between the first electrode sheet 110 and the second electrode sheet 120 to form a first capacitor; and a second facing distance 105 is provided between the first electrode sheet 110 and the third electrode sheet 130 to form a second capacitor. One end of the swinging member 230 extends into the first facing distance 104 and the second facing distance 105, and the rocker assembly 600 is configured to push the upper rocker arm 210 and the lower rocker arm 220 to swing, thereby driving the swinging member 230 to swing within the first facing distance 104 and the second facing distance 105. As the swinging member 230 swings within the first facing distance 104 and the second facing distance 105, the area of the swinging member 230 within the first facing distance 104 and the second facing distance 105 changes, thereby changing the capacitance value of the first capacitor and the capacitance value of the second capacitor.

Figure 4:
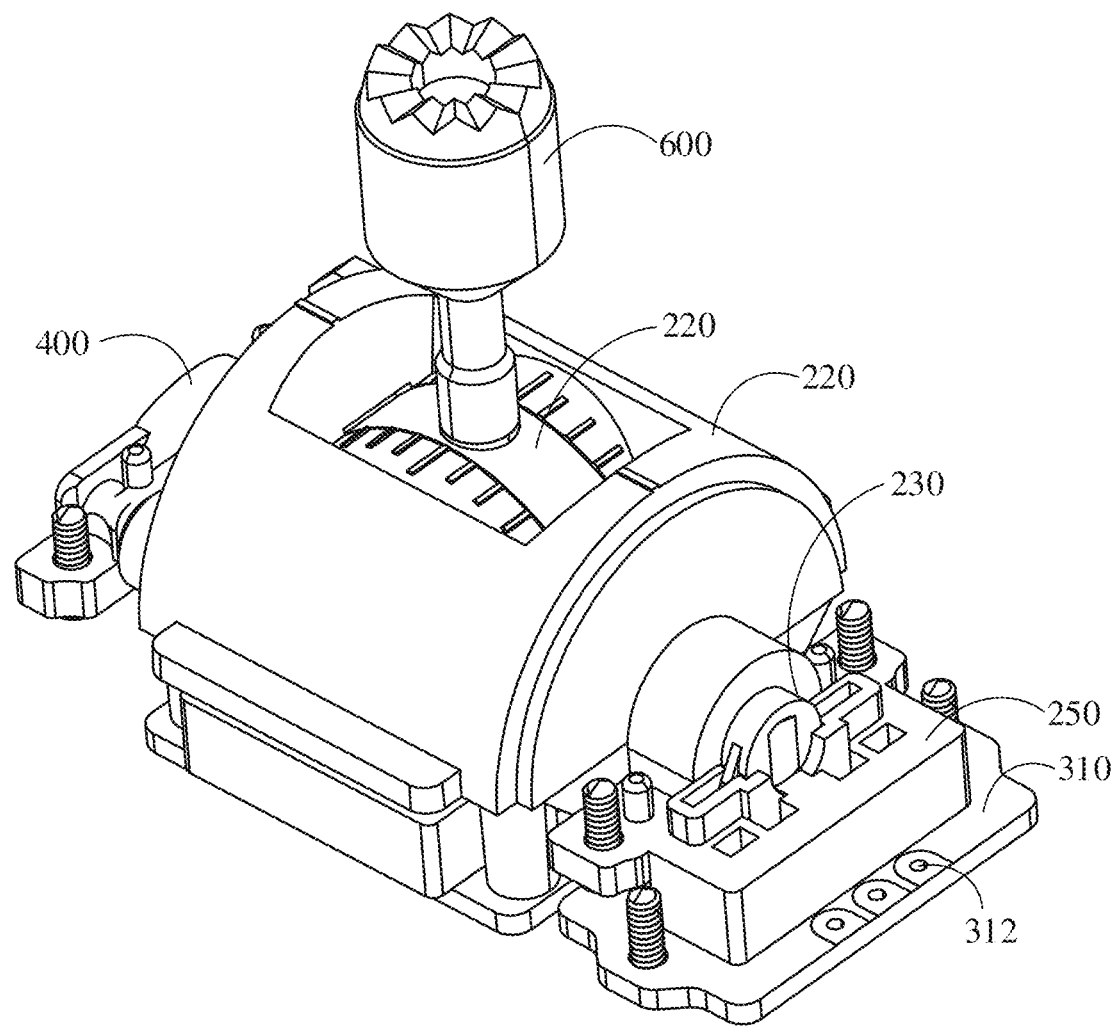
FIG. 4 is a schematic structural view of the capacitor rocker device without a shell in FIG. 1.
Figure 5:
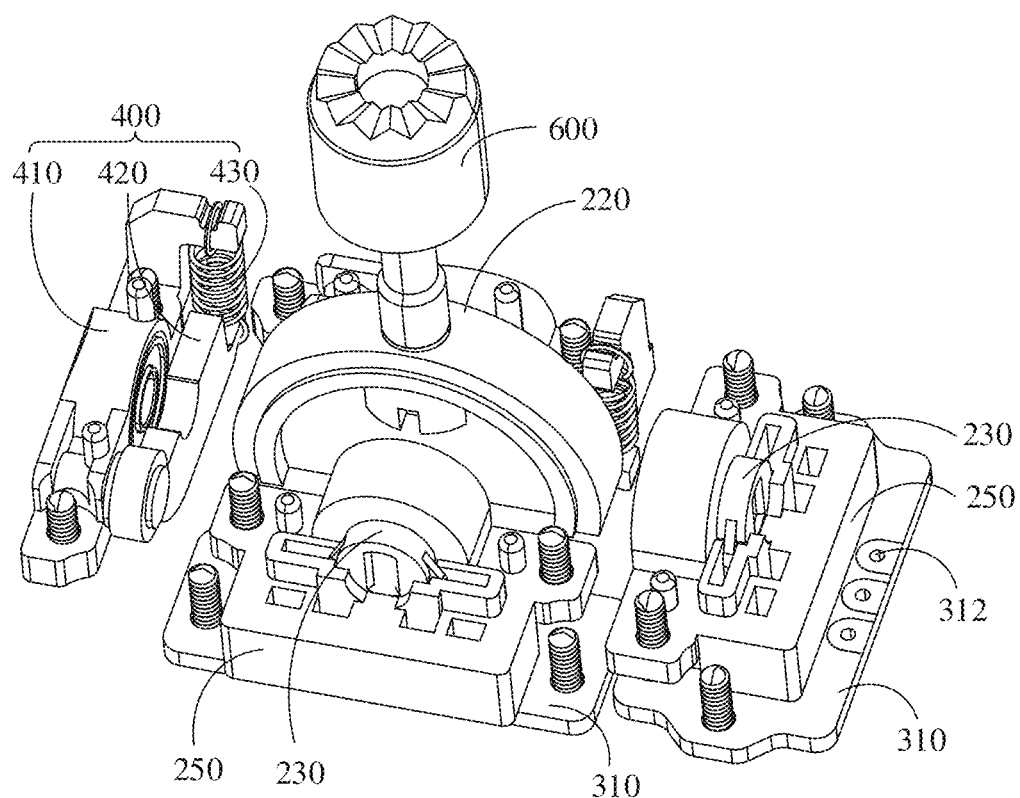
FIG. 5 is a schematic structural view of the capacitor rocker device without a rocker arm in FIG. 4.
Figure 6:
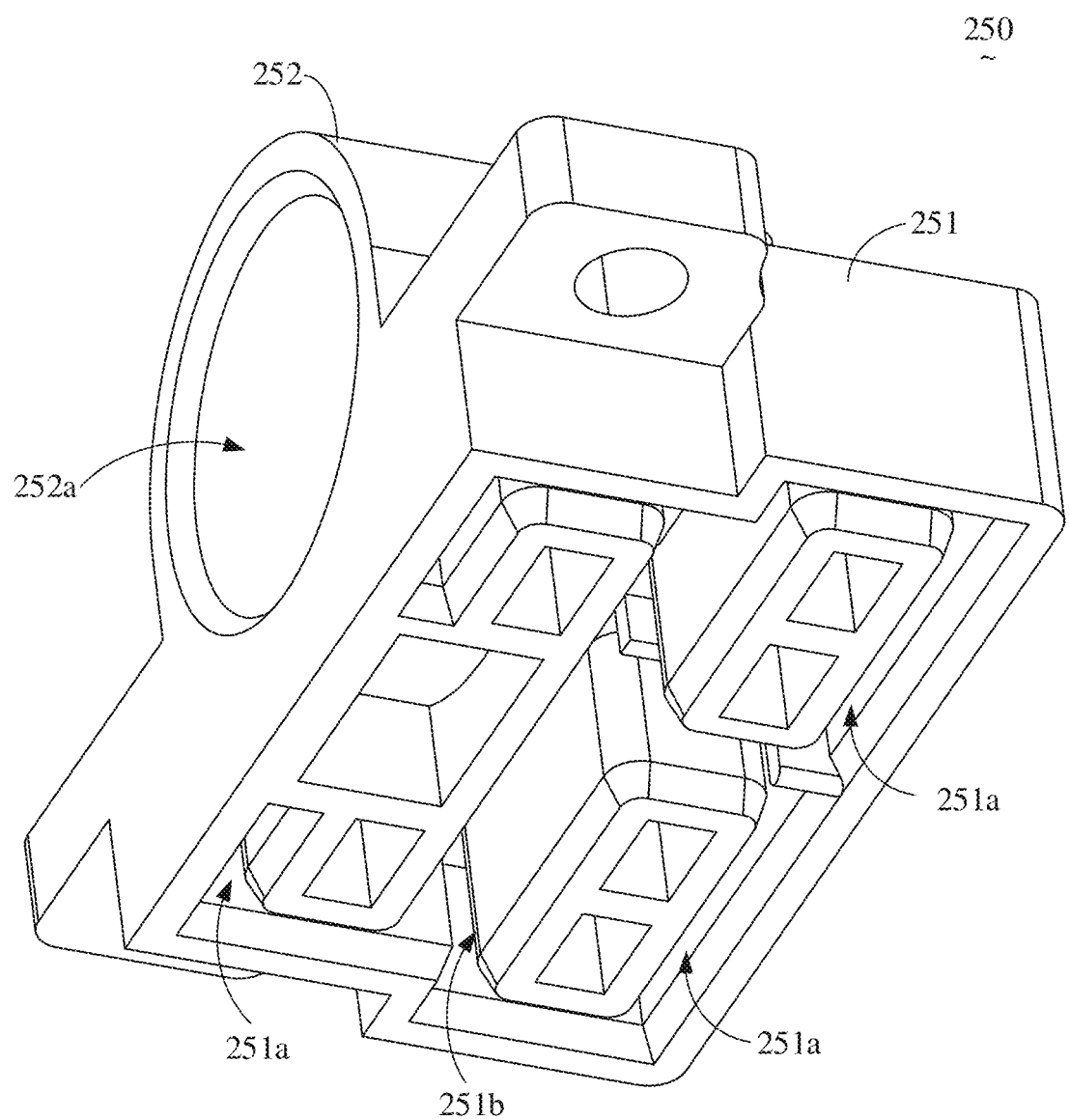
FIG. 6 is a schematic structural view of an installation seat according to an embodiment of the present application.
Figure 7:
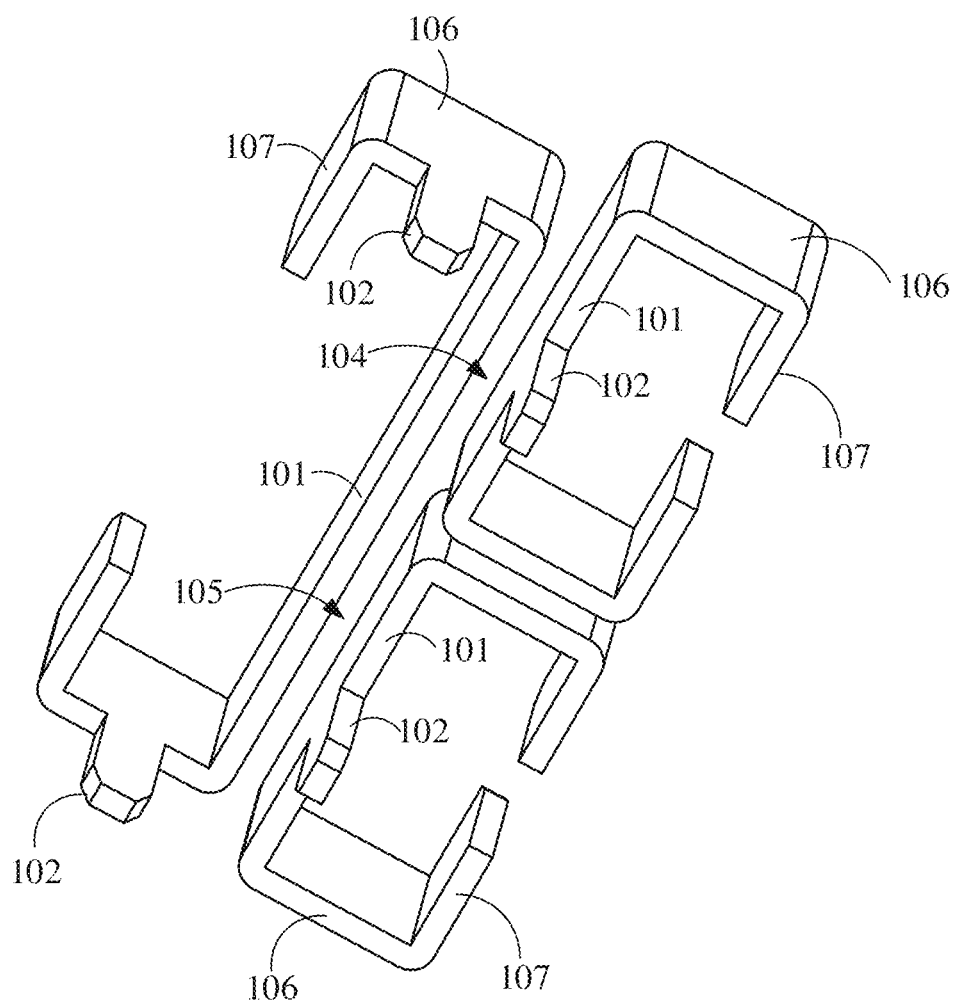
FIG. 7 is a schematic structural view of a capacitor assembly according to an embodiment of the present application.

As for the corresponding position information output, taking the control of the flight of the drone as an example, the position information refers to the control instructions for the operator to control the motion trajectory of the drone in a specific space by tilting the rocker. Usually, the electric control board 310 is provided with a signal output terminal 312, and the electric control board 310 is electrically connected to the main control circuit in the remote control through the signal output terminal 312, so as to transmit the corresponding position information to the main control circuit in the remote control. In an embodiment, as shown in FIG. 3 to FIG. 5, the connection part of the signal output terminal 312 is provided in a hole shape.

The electric control board 310 is a circuit board with intelligent automation characteristics, which plays the role of the main control center in the device. The electric control board 310 usually includes a power input terminal and a power output terminal, a mounting plate, a control module, etc. The power input terminal and the power output terminal are configured to connect an external power supply to supply power to other components. The mounting plate is also called a base plate or a main board. It is the core part of the electric control board 310 and is configured to fix and connect various electronic components. The mounting plate is usually provided with left and right or upper and lower snap slots or snap connection holes for fixing and connecting various electronic components. The control module is responsible for the control function of the electric control board 310. According to actual needs, the control module can be a linear transformer, a switching power supply module, etc. In addition, the electric control board 310 can also integrate other components according to actual needs, such as a communication interface, a display interface, a switch button, etc.

The capacitance detection chip 320 is a chip that can convert capacitance into voltage or other quantities, and is often used in capacitance detection circuits. The basic measurement principle of the capacitance detection chip 320 is: by charging and discharging the measured capacitance and the reference capacitance simultaneously in opposite timing, and converting the difference between the measured capacitance and the reference capacitance into a voltage output through current integration, low-pass filtering, amplification, etc. In this embodiment, the capacitance detection chip 320 is configured to detect the capacitance value of the first capacitor and the capacitance value of the second capacitor.

Figure 2:
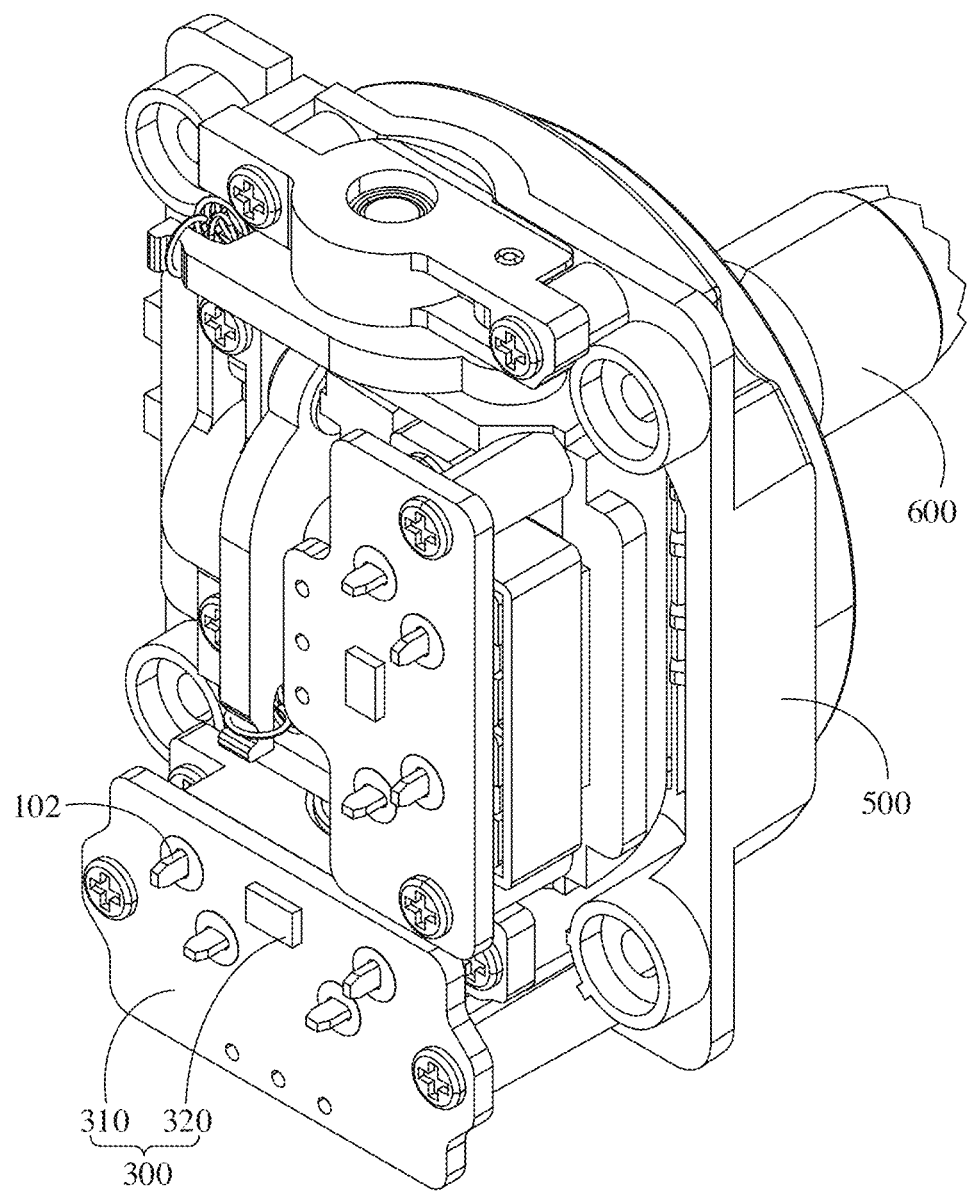
FIG. 2 is a schematic side view of the capacitor rocker device in FIG. 1.

In one embodiment, as shown in FIG. 2, the number of control assemblies 300 is two, and each control assembly 300 controls one capacitor assembly 100. That is, there are two electric control boards 310 and two capacitor detection chips 320, and one electric control board 310 and one capacitor detection chip 320 form one electric control assembly. In this embodiment, the volume of the electric control assembly is reduced by separately setting the control part of each capacitor assembly 100, so as to miniaturize the capacitor rocker device 10. In other embodiments, the number of control assemblies 300 can be one, that is, two capacitor assemblies 100 are electrically connected to one control assemblies 300 at the same time.

In one embodiment, the first electrode sheet 110/the second electrode sheet 120/the third electrode sheet 130 includes an electrode sheet body 101 and a third connection portion 102 provided on the electrode sheet body 101, and the third connection portion 102 is welded to the electric control board 310. The third connection portion 102 is integrally formed with the electrode sheet body 101, so that the electrode sheet can be connected to the electric control board 310 without any additional connection device.

Based on the previous embodiment, in order to facilitate the positioning of the electrode sheet, the electric control board 310 is provided with a second installation through hole 311, and the third connection portion 102 is welded to the electric control board 310 after being passed through the second installation through hole 311.

In an embodiment, in order to further facilitate the arrangement and installation of the electrode sheet, the capacitor rocker device 10 includes an installation seat 250 for installing the capacitor assembly 100. The installation seat 250 includes a base 251 and an installation portion 252 provided on the base 251, the installation portion 252 is provided with a first installation through hole 252a, and the base 251 is provided with three first installation grooves 251a, and a second installation groove 251b. The three first installation grooves 251a are correspondingly installed with the first electrode sheet 110, the second electrode sheet 120, the third electrode sheet 130 respectively, the opening of the first installation groove 251a is provided toward the electric control board 310, one side of the second installation groove 251b is communicated with the three first installation grooves 251a, the other side of the second installation groove 251b is communicated with the first installation through hole 252a, and the swinging member 230 extends into the second installation groove 251b.

In another embodiment, in order to further simplify the installation structure of the electrode sheet, the first electrode sheet 110/the second electrode sheet 120/the third electrode sheet 130 includes a first bending portion 106 and a second bending portion 107, and the electrode sheet body 101, the first bending portion 106 and the second bending portion 107 are bent in sequence. In this embodiment, the electrode sheet is bent, so that the electrode sheet can be limitedly installed by relying on the groove wall of the first installation groove 251a and the electric control board 310, thereby simplifying the installation structure of the electrode sheet.

In one embodiment, the upper rocker arm 210/lower rocker arm 220 includes a rocker arm body 201, a first connection portion 202 and a second connection portion 203. The second connection portion 203 and the first connection portion 202 are provided at opposite ends of the rocker arm body 201. The swinging member 230 is provided at the first connection portion 202. The capacitor rocker device 10 further includes a reset assembly 400, the reset assembly 400 is provided at the second connection portion 203, and the reset assembly 400 is configured to restore the rocker body, the rocker arm 220 and the swinging member 230 to an initial position. Thus, in this embodiment, by disposing the reset assembly 400, the capacitor rocker device 10 has the following advantages:

Ensuring that the starting point of each operation is consistent: The reset assembly 400 of the capacitor rocker device 10 can ensure that the starting point of each operation is consistent, which can improve the accuracy and consistency of the operation.

Facilitating maintenance and adjustment: If the rocker fails during use or needs to be repaired and adjusted, the reset assembly 400 can easily restore the rocker to its initial state for easy maintenance and adjustment.

Preventing accidental stoppage: In some cases, if there is no reset assembly 400, the rocker may be unable to continue to be used due to accidental stoppage. The reset assembly 400 can prevent this from happening and ensure that the rocker can continue to be used normally.

In an embodiment, as shown in FIG. 3, the reset assembly 400 includes a first reset arm 410, a second reset arm 420 and an elastic reset member 430. The first reset arm 410 is provided on the second connection portion 203, one end of the second reset arm 420 is rotationally connected to the first reset arm 410, and the other end of the second reset arm 420 is connected to the first reset arm 410 through the elastic reset member 430.

In an embodiment, in order to reduce the swinging space of the swinging member 230 between the first facing distance 104 and the second facing distance 105, the end surface of the swinging member 230 inserted into the first facing distance 104 and the second facing distance 105 is provided in a convex arc shape.

The present application also provides a remote control, which includes a remote control body and a capacitor rocker device 10. The specific structure of the capacitor rocker device 10 refers to the above embodiment. Since the remote control adopts all the technical solutions of all the above embodiments, it at least has all the beneficial effects brought by the technical solutions of the above embodiments, which will not be described one by one here.

The remote control is usually configured to remotely control drones, game consoles or other products that require similar remote control, which will not be described one by one here.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A capacitor rocker device, comprising:
a shell;
two rocker arm assemblies, installed on the shell, wherein each rocker arm assembly comprises a rocker arm, a swinging member, a bearing and an installation seat, and the rocker arm comprises a rocker arm body and a first connection portion provided on the rocker arm body; the installation seat is provided with a first installation through hole, and the first connection portion is penetrated through the first installation through hole; the bearing is sleeved on the first connection portion, and the bearing is provided inside the first installation through hole; the swinging member is provided on the first connection portion;
a rocker assembly, configured to push the rocker arm to rotate and drive the swinging member to swing;
two capacitor assemblies, wherein each capacitor assembly comprises a first electrode sheet, a second electrode sheet and a third electrode sheet, and the second electrode sheet and the third electrode sheet are provided on a same side of the first electrode sheet; a first facing distance is provided between the first electrode sheet and the second electrode sheet to form a first capacitor; a second facing distance is provided between the first electrode sheet and the third electrode sheet to form a second capacitor; one end of the swing member is configured to extend into the first facing distance and the second facing distance, and the rocker assembly is configured to push the rocker arm to swing and drive the swing member to swing within the first facing distance and the second facing distance; a capacitance value of the first capacitor and a capacitance value of the second capacitor change with the swing of the swing member; and
a control assembly, installed on the shell, wherein the control assembly comprises an electric control board and a capacitance detection chip provided on the electric control board and electrically connected to the electric control board; the electric control board and the capacitance detection chip are electrically connected to the first electrode sheet, the second electrode sheet and the third electrode sheet respectively; the capacitance detection chip is configured to detect the capacitance value of the first capacitor and the capacitance value of the second capacitor, and the electric control board is configured to output corresponding position information according to a change in a ratio of the capacitance value of the first capacitor to the capacitance value of the second capacitor.

2. The capacitor rocker device of claim 1, wherein the control assembly comprises two control assemblies, and each control assembly is configured to control a corresponding capacitor assembly of the two capacitor assemblies.

3. The capacitor rocker device of claim 1, wherein the first electrode sheet comprises an electrode sheet body and a third connection portion provided on the electrode sheet body; the second electrode sheet comprises an electrode sheet body and a third connection portion provided on the electrode sheet body of the second electrode sheet; and the third electrode sheet comprises an electrode sheet body and a third connection portion provided on the electrode sheet body of the third electrode sheet, and
each of the third connection portion of each of the first to third electrode sheets is welded to the electric control board, and each of the third connection portion of each of the first to third electrode sheets is integrally formed with the electric control board.

4. The capacitor rocker device of claim 3, wherein the electric control board is provided with a second installation through hole, and each of the third connection portion of each of the first to third electrode sheets is penetrated through the second installation through hole to be welded to the electric control board.

5. The capacitor rocker device of claim 3, wherein the installation seat is configured to install a corresponding capacitor assembly of the two capacitor assemblies, and the installation seat comprises a base and an installation portion provided on the base; the installation portion is provided with the first installation through hole, and the base is provided with three first installation grooves and a second installation groove; the three first installation grooves are configured to install the first electrode sheet, the second electrode sheet and the third electrode sheet respectively; an opening of each of the three first installation grooves is provided toward the electronic control board; one side of the second installation groove is communicated with the three first installation grooves, and the other side of the second installation groove is communicated with the first installation through hole; the swinging member of each rocker arm assembly is configured to extend into the second installation groove.

6. The capacitor rocker device of claim 3, wherein the first electrode sheet comprises a first bending portion and a second bending portion; the second electrode sheet comprises a first bending portion and a second bending portion; and the third electrode sheet comprises a first bending portion and a second bending portion, and each of the electrode sheet body of the first to third electrode sheets, each of the first bending portion of the first to third electrode sheets and each of the second bending portion of the first to third electrode sheets are bent in sequence.

7. The capacitor rocker device of claim 1, wherein the rocker arm comprises a second connection portion, and the second connection portion and the first connection portion are provided at opposite ends of the rocker arm body; the swinging member of each rocker arm assembly is provided on the first connection portion; the capacitor rocker device further comprises a reset assembly provided on the second connection portion, and the reset assembly is configured to restore the rocker arm of each rocker arm assembly and the swinging member of each rocker arm assembly to initial positions.

8. The capacitor rocker device of claim 7, wherein the reset assembly comprises a first reset arm, a second reset arm and an elastic reset member, and the first reset arm is provided on the second connection portion; one end of the second reset arm is rotatably connected to the first reset arm, and the other end of the second reset arm is connected to the first reset arm through the elastic reset member.

9. The capacitor rocker device of claim 1, wherein an end surface of the swinging member inserted into the first facing distance and the second facing distance is provided in a convex arc shape.

10. A remote control, comprising the capacitor rocker device of claim 1.

* * * * *